US006364565B1

(12) United States Patent
Billimack et al.

(10) Patent No.: US 6,364,565 B1
(45) Date of Patent: Apr. 2, 2002

(54) PISTON PIN ASSEMBLY

(75) Inventors: James J. Billimack, Metamora; Mark W. Jarrett, Morton; Neil E. Johnston, East Peoria, all of IL (US)

(73) Assignee: Caterpillar Inc., Peoria, IL (US)

(*) Notice: Subject to any disclaimer, the term of this patent is extended or adjusted under 35 U.S.C. 154(b) by 0 days.

(21) Appl. No.: 09/495,669

(22) Filed: Feb. 1, 2000

(51) Int. Cl.[7] .................................................. F16J 1/16
(52) U.S. Cl. ....................... 403/150; 403/156; 403/308
(58) Field of Search ................................ 403/150–156, 403/161–163, 308–309; 92/187

(56) References Cited

U.S. PATENT DOCUMENTS

| | | | | |
|---|---|---|---|---|
| 1,268,282 A | | 6/1918 | Royer | 92/187 |
| 1,838,901 A | | 12/1931 | Blackmore | 92/187 |
| 1,943,364 A | | 1/1934 | Betz | 92/187 |
| 2,343,719 A | | 3/1944 | Ulrich | 92/187 |
| 3,136,306 A | | 6/1964 | Kamm | 123/41.38 |
| 3,574,293 A | * | 4/1971 | Vriend | 92/84 |
| 4,311,406 A | | 1/1982 | Driver | 403/161 |
| 4,359,913 A | * | 11/1982 | Mahlke | 74/579 E |
| 4,430,906 A | * | 2/1984 | Holtzberg et al. | 74/595 |
| 5,065,508 A | | 11/1991 | Lorento et al. | 29/888.042 |
| 5,115,726 A | | 5/1992 | Daxer et al. | 92/219 |
| 5,289,758 A | * | 3/1994 | Berlinger | 92/190 |
| 5,327,813 A | * | 7/1994 | DeBell et al. | 92/187 |
| 5,341,723 A | | 8/1994 | Hung | 91/224 |
| 5,421,245 A | | 6/1995 | Christoffel et al. | 92/187 |
| 5,653,204 A | | 8/1997 | Shaffer | 123/193.6 |
| 5,688,113 A | * | 11/1997 | Bareiss et al. | 417/549 |
| 5,850,777 A | * | 12/1998 | Marklin et al. | 92/187 |
| 6,262,733 B1 | * | 5/2000 | Cobble | 384/294 |

* cited by examiner

*Primary Examiner*—Lynne H. Browne
*Assistant Examiner*—John P. Walsh
(74) *Attorney, Agent, or Firm*—Rogitz & Associates

(57) ABSTRACT

A method for reducing the incidence of piston pin failure by providing a retainer assembly for piston pin plugs such that the plugs cannot be removed or shaken lose during operation. A plastic rod is inserted into the piston pin, and the rod is ultrasonically welded to the stems of mushroom-shaped plastic piston plugs such that the plugs cover the open ends of the pin and are held in place by the cooperation of structure between the plugs and the rod. In an alternate embodiment, the stem of each pin plug is hollow and a respective internally threaded brass insert is disposed in the stem and ultrasonically welded therein. An externally threaded rod is then engaged with the two internally threaded inserts to hold the plugs on the piston pin.

6 Claims, 1 Drawing Sheet

120
122
126
130
134
132
128
138
136
124
140
142

PISTON PIN ASSEMBLY

TECHNICAL FIELD

The present invention relates generally to vehicle engines, and more particularly to piston pins.

BACKGROUND ART

In internal combustion engines, the bottom ends of the piston rods are coupled to a crankshaft and the top ends are coupled to respective piston crowns such that linear reciprocating motion of the piston crowns is converted to rotational motion of the crankshaft. Accordingly, the top ends of the rods must be coupled to the piston crowns, which move in only a single degree of freedom, in such a way that permits the bottom ends of the rods to move in two degrees of freedom.

The key mechanism in coupling a piston rod to a piston crown is the piston pin, which passes through a piston skirt and piston crown and continues on through the piston rod. By means of the piston pin, the piston crown and the piston rod are firmly joined together. It will be readily appreciated that the failure of a piston pin could result in misalignment and/or separation of these components, which could cause severe engine damage.

It happens that piston pins ordinarily are held with metal clips, which can fail. Accordingly, as recognized herein, it is desirable to provide a means for holding the piston pins in engagement with the piston rod. The present invention further understands that this can be accomplished using piston plugs that are inserted into the pins, but that it is possible for the plugs to shake loose from the pins during operation, thereby potentially causing damage to the engine. The present invention understands that simply gluing the plugs to the pins would be less than effective, because the adhesive could potentially lose its effectiveness in the harsh engine environment. Accordingly, the present invention provides the solutions disclosed herein to retain plastic piston plugs in piston pins.

DISCLOSURE OF THE INVENTION

A piston pin assembly includes a hollow piston pin defining first and second ends. A first pin plug is disposed in the first end and a second pin plug is disposed in the second end. A rod interconnects the plugs.

In a preferred embodiment, each pin plug includes a head disposed outside the piston pin and a stem disposed within the pin. In a first embodiment, the stem of each pin plug can be solid, and both the stems of the pin plugs and the rod are made of plastic. In this first embodiment, the stems are ultrasonically welded to the rod.

In a second preferred embodiment, the stem of each pin plug is hollow and the rod is externally threaded. A respective internally threaded brass insert is disposed in each stem for threadably engaging the rod. To permit rotating the head of at least one of the plugs by manipulating a tool, the head is formed with at least one engagement surface configured for engaging the tool. The engagement surface can be established by at least one notch.

In another aspect, a piston pin plug retainer assembly includes a rod disposable in a hollow piston pin having opposed open ends, and first and second plastic plugs affixed to opposite ends of the rod to cover the open ends of the piston pin.

In still another aspect, a method for retaining first and second plastic pin plugs in first and second ends of a piston pin includes coupling the first plug to a rod, and advancing the rod into the piston pin. The second plug is coupled to the rod. If desired, both plugs can be coupled to the rod after the rod is advanced into the pin.

The details of the present invention, both as to its structure and operation, can best be understood in reference to the accompanying drawings, in which like reference numerals refer to like parts.

BEST MODE FOR CARRYING OUT THE INVENTION

Figure 1:
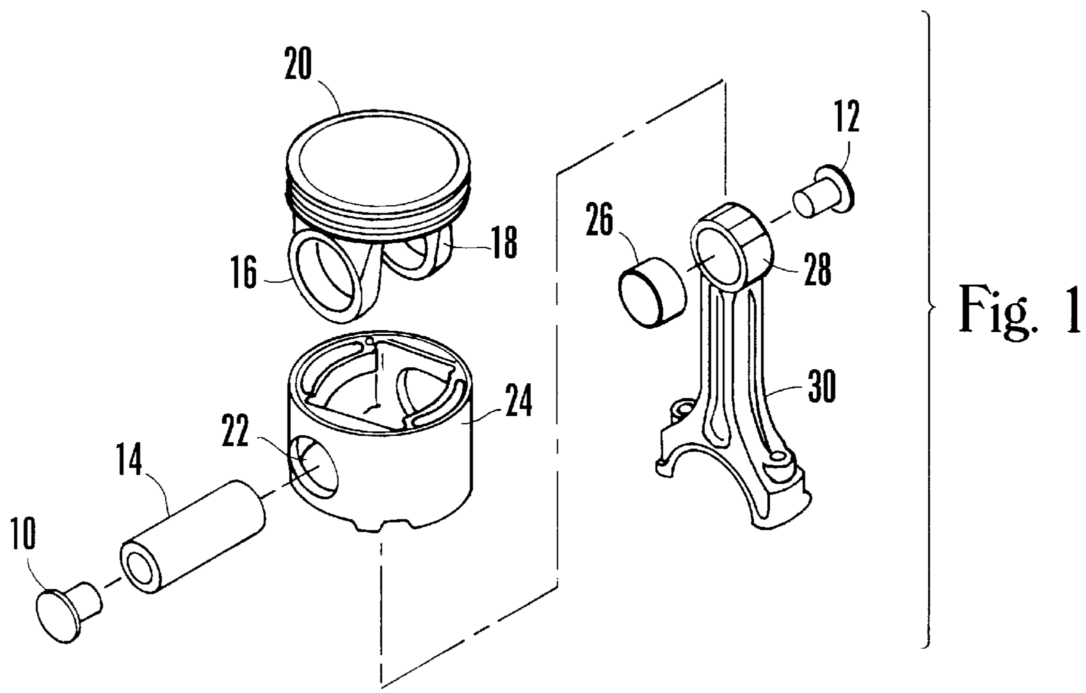
FIG. 1 is an exploded view of a piston assembly with the present piston pin plugs, with portions removed for clarity.

Referring initially to FIG. 1, left and right piston pin plugs 10, 12 engage open opposed ends of a piston pin 14 and are held in place using structures shown further below in reference to FIGS. 2 and 3. The piston pin 14 is received through brackets 16, 18 of a piston crown 20 and through opposed openings 22 of a piston skirt 24. Also, the piston pin 14 is received through a bearing 26 and a pin fitting 28 of a piston rod 30. The piston rod 30 in turn is coupled to an engine crankshaft in accordance with well-known principles. With this structure, reciprocating motion of the piston in a cylinder is transformed to rotational motion of the crankshaft.

Figure 2:
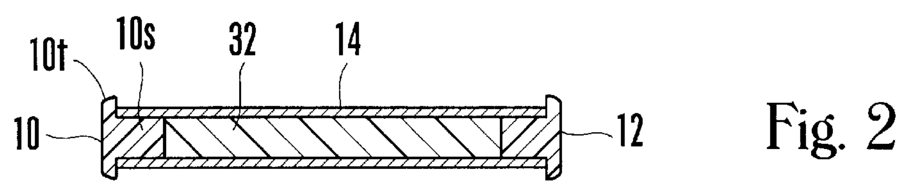
FIG. 2 is a cross-sectional view of the pin retainer assembly of the present invention.

The details of the present pin retainer can be seen in reference to FIG. 2, wherein a solid or hollow plastic piston pin rod 32, preferably made of polyethersulfone (PES) or other appropriate plastic, lies inside piston pin 14, with the plastic piston plugs 10 and 12 sealing the ends of that piston pin. As shown, each plug 10, 12 is mushroom-shaped. Accordingly, taking the left plug 10 as an example, the left plug 10 includes a preferably solid cylindrical stem 10*s* and a solid dome-shaped head 10*t*. If desired, however, the stem 10*s* can be hollow. Preferably, the plugs 10, 12 can also be made of PES.

The assembly shown in FIG. 2 is established by inserting the stem 10s of the piston plug 10 into the left end of the piston pin 14, as shown, and then advancing the plastic piston pin rod 32 into the right end of the pin 14. The piston plug 10 and the piston pin rod 32 are then fastened together, preferably by ultrasonically butt-welding them together as shown. Then, the stem of the right plug 12 is inserted into the right end of the piston pin 14 and ultrasonically butt-welded to the rod 32, thus forming a solidly welded single unit.

It is to be understood that the right plug 12 could be first inserted into the pin 14, then the rod 32 advanced into the pin 14, and then the left plug 10 advanced against the rod 32. Or, the rod 32 can be disposed in the pin 14, and then both plugs 10, 12 welded to the rod 32.

Figure 3:
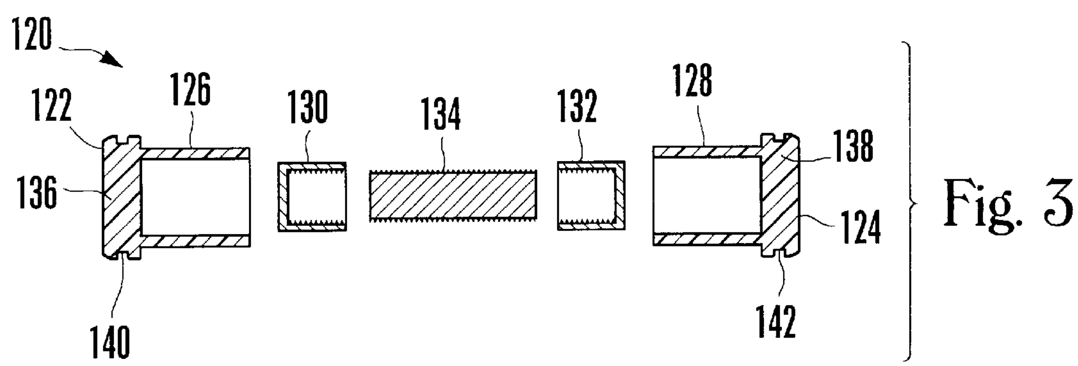
FIG. 3 is an exploded cross-sectional view of an alternate piston pin retainer assembly.

Now referring to FIG. 3, an alternate piston pin retainer is shown, generally designated 120. In this alternate embodiment, left and right plastic pin plugs 122, 124 are provided that are in all essential respects identical to the plugs 10, 12 discussed above, with the following exceptions.

The stems 126, 128 of the plugs 122, 124 are hollow, and a respective hollow cylindrical internally threaded insert 130, 132 is disposed in each stem 126, 128. The inserts 130,

132 can be made of brass. If desired, the inserts 130, 132 can be ultrasonically welded to the inside of the respective plug stem 126, 128.

As also shown in FIG. 3, a hollow or more preferably solid cylindrical externally threaded plastic or metal rod 134 is threadably engaged with one of the inserts 130, 132 to couple the rod 134 to the respective plug 122, 124. The rod 134 is advanced into a piston pin such as the pin 14 shown in FIGS. 1 and 2, and then the second insert 132, 130 is threadably engaged with the rod 134 to couple the rod 134 to the respective plug 124, 122.

If desired, the head 136, 138 of each of the plugs 122, 124 can be formed with an engagement surface that is configured for engaging a tool to permit rotating the head 136, 138 by manipulating the tool. In one preferred embodiment, the engagement surfaces can be established by notches 140, 142 on the respective heads 136, 138 of the plugs 122, 124 to provide a grip point to help tighten the assembly 120 together. A thread lock can be used to retain the integrity of the assembly.

INDUSTRIAL APPLICABILITY

In operation, either one of the plug retainer assemblies described above are engaged with respective piston pins, after the pins have been coupled to piston assemblies as set forth previously. Owing to the above-disclosed combination of structure, the plug retainer assemblies hold the plugs 10, 12, 122, 124 into the respective piston pins during engine operation.

While the particular piston pin assembly as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more".

What is claimed is:

1. A piston pin assembly, comprising:

a hollow piston pin defining first and second ends;

a first pin plug disposed in the first end;

a second pin plug disposed in the second end;

a respective internally threaded insert disposed in each plug; and an externally threaded rod interconnecting the plugs, the rod threadably engaging the inserts.

2. The assembly of claim 1, wherein the inserts are made of brass.

3. The assembly of claim 2, wherein each plug defines a head and a stem, the head of at least one pin plug being formed with at least one engagement surface configured for engaging a tool to permit rotating the head by manipulating the tool.

4. The assembly of claim 3, wherein the engagement surface is established by at least one notch.

5. A piston pin plug retainer assembly, comprising:

a rod disposable in a piston pin having opposed open ends, the rod being externally threaded;

first and second plastic plugs engaged with opposite ends of the rod to cover the open ends of the piston pin, each plug defining a head and a hollow stem; and a respective threaded insert disposed in each stem for threadably engaging the rod.

6. The assembly of claim 5, wherein the head of at least one pin plug is formed with at least one engagement surface configured for engaging a tool to permit rotating the head by manipulating the tool.

* * * * *